United States Patent Office 3,535,849
Patented Oct. 27, 1970

3,535,849
PROCESS FOR THE SEPARATION OF ACRYLO-NITRILE AND ACETONITRILE BY ABSORPTION, EXTRACTIVE DISTILLATION AND SOLVENT STRIPPING
Arnold Hausweiler, Dormagen, and Feliks Bitners and Karl-Heinrich Knapp, Leverkusen, Germany, assignors to Erdölchemie Gesellschaft mit beschränkter Haftung and Farbenfabriken Bayer Aktiengesellschaft, Leverkusen, Germany, both corporations of Germany
Filed June 24, 1968, Ser. No. 739,529
Claims priority, application Germany, June 24, 1967, E 34,239
Int. Cl. B01d 3/40, 19/00; C07c 121/32
U.S. Cl. 55—38                    8 Claims

ABSTRACT OF THE DISCLOSURE

Process for separating acrylonitrile and acetonitrile from gaseous mixtures containing such nitriles, e.g. the reaction mixture resulting from the catalytic oxidation of propylene in the presence of ammonia, in which such nitriles are washed out from the starting gas with wash water, e.g. in countercurrent flow and e.g. at temperatures of about 40–100° C., in a first washing section, the resulting aqueous phase run-off is conducted from the first section to a second acrylonitrile stripping section for driving off and collecting, e.g. essentially all, the acrylonitrile in gaseous form from such aqueous phase by extractive distillation in the second section, optionally at most a part (and alternatively none) of the acrylonitrile-depleted aqueous phase run-off from the second section is conducted to a third acetonitrile stripping section for driving off and collecting the acetonitrile contained therein, at least a part (and optionally all) of the acrylonitrile-depleted aqueous phase-off from said second section yet which still contains acetonitrile is conducted as wash water to the first section, e.g. such that already water-washed gas in countercurrent flow in the first section first contacts such incoming acetonitrile-containing aqueous phase run-off from the second section and desorbs acetonitrile therefrom to provide thereby acetonitrile depleted wash water for contact thereafter with starting gaseous mixture to wash acrylonitrile and acetonitrile therefrom, and in which the resultant water-washed gas from the first section depleted of acrylonitrile by such washing yet containing acetonitrile desorbed thereby from the incoming acetonitrile-containing wash water conducted to the first section from the second section is recovered and burned; with the optional conducting of the resulting acetonitrile-depleted aqueous residue from the third section, when used, to the second section to enhance the extractive distillation of acrylonitrile therein; and with the alternative, where no aqueous phase run-off is conducted from the second section to the third section, of conducting all of the aqueous phase run-off from the second section to the first section such that all of the acetonitrile removed from the system is removed by burning with the water-washed gas recovered from the first section, yet with a part of the acetonitrile-depleted wash water prior to washing with the starting gas being conducted to the second section to enhance the extractive distillation of acrylonitrile therein.

Figure 1:
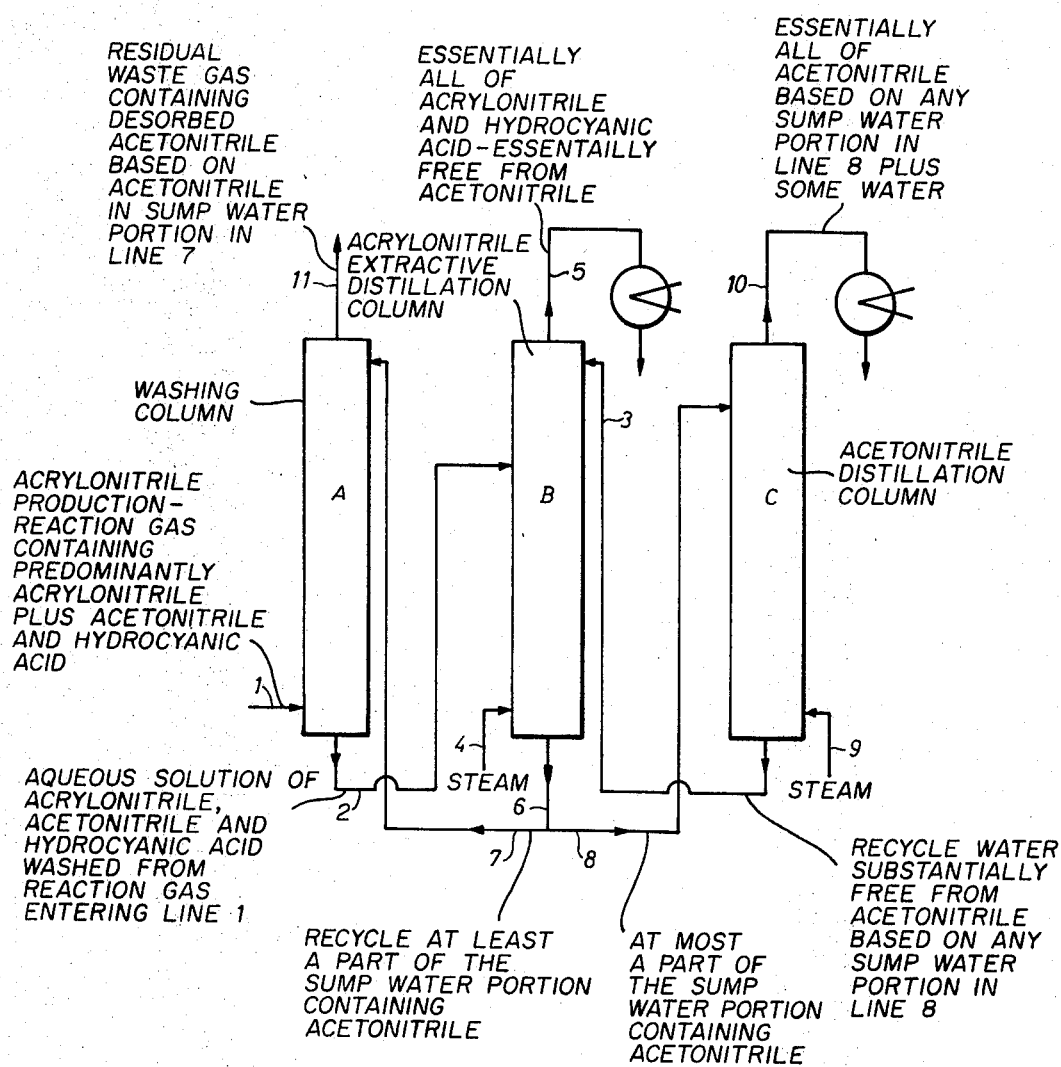

This invention relates to a process for separating acrylonitrile from acetonitrile.

In the known processes for the production of acrylonitrile by catalytic oxidation of propylene in the presence of ammonia, substantial amounts of acetonitrile and hydrocyanic acid always formed as byproducts. The distillative separation of hydrocyanic acid from acrylonitrile presents no technical difficulties, but the separation of acrylonitrile and acetonitrile by distillation involves considerable expenditure; in the known processes it is carried out by means of extractions or extractive distillations. The processes which make use of extractive distillation have hitherto attained the greatest importance in practice.

For this purpose, the reaction gas which leaves the reaction vessel and is freed from excess ammonia is washed in a first absorption column with water. In this column all of the acetonitrile and part of the acrylonitrile and hydrocyanic acid, or the whole of all these products, is washed out from the gas. The resulting nitrile-free reaction gas still contains residual propylene as well as propane and carbon oxides; to remove these substances, this gas is burnt in admixture with air in a torch or furnace.

The aqueous solution of the nitriles from the first column is passed to a second column which is heated at the base and is fed with acetonitrile-free water at the head. By extractive distillation in the second column, the acrylonitrile and hydrocyanic acid distil in gaseous form from the head and thus are separated from the acetonitrile, which is withdrawn as an aqueous solution at the base and is passed to a third column where it is distilled off from the water.

The run-off from the sump of the third column consists of water which is cooled and recycled to the first and second columns.

A disadvantage of these prior processes is that the acetonitrile separator (the third column) is fed with a very large amount of water with a comparatively small amount of acetonitrile (less than 1% by weight) and that the steam consumption in this column for driving of the acetonitrile is accordingly high, since the water must be heated to boiling point. This expenditure is very uneconomical, particularly since in the hitherto known processes the separated acetonitrile must subsequently be destroyed, in part or completely, by combustion.

A sufficient use for the large amounts of acetonitrile obtained as byproducts in the acrylonitrile processes does not yet exist.

The present invention provides a process for the separation of acrylonitrile and acetonitrile which can be carried out in a substantially more economical manner, particularly if the resultant acetonitrile has to be partially or completely destroyed by combustion. The process comprises washing out the two nitriles from a gaseous mixture with wash water in a first washing section or absorption zone; conducting the aqueous run-off from the first washing section into a stripping section or extractive distillation zone where most of the acrylonitrile is driven in gaseous form from the section by extractive distillation; conducting part of the aqueous run-off from the second stripping section or distillation zone to a third stripping section in order to separate and collect the acetonitrile contained therein; conducting part of the aqueous run-off from the second stripping section as wash water to the first washing section where the substantially acrylonitrile-free gas is driven off with acetonitrile contained therein; and burning the latter in the gas leaving the first washing section.

The three sections may of course belong to the usual types of stripping column.

In the process according to the invention, not all but only part of the run-off from the second section, which contains water and acetonitrile, goes to the third or acetonitrile-stripping section where the acetonitrile is driven off with a correspondingly small amount of steam.

The remaining acetonitrile-containing aqueous liquid from the second column is conducted to the first column. In the upper part of this column, the predominant part of the acetonitrile is driven off from the wash water by the reaction gases passing through the column, and conducted to a combustion furnace or torch. The first washing column thus has a two-fold function: in the lower part (such as 80–90% of the whole length of the column), acting as a washing zone, the reaction gas entering from below is washed with the wash water flowing in from above so that substantially all the nitriles are removed. For reasons of equilibrium, the acetonitrile cannot be completely removed, as the wash water already contains acetonitrile from the third column.

In the upper part of the first column (such as 10–20% of the whole length of the column), acting as a desorption zone, the predominant part of the acetonitrile introduced with the wash water is driven off from the gas which is virtually free from acrylonitrile and hydrocyanic acid.

The acetonitrile remaining in the wash water arrives at the sump of the column from where it is conducted, together with the products washed out of the gas, to the second column.

With the use of only 5 to 10 practical exchange plates in the desorption zone of the first column, more than 90% of the acetonitrile introduced can be removed from the wash water and blown off from the head of the column. The temperature of the wash water charged with acetonitrile may vary within wide limits, for example, between 40° and about 100° C., since, due to the saturation of the gas with water in the desorption zone, the liquid leaving the latter will acquire the approximate inlet temperature of the gas.

If the reaction gas entering the first washing column contains substantially less acetonitrile than the gas described in the example below (that is, substantially less than 320 kg. of acetonitrile per 54,800 cubic metres of the gas, i.e. at standard temperature and pressure), a third stripping column is no longer necessary; all the run-off from the sump of the second section may be directly conducted as wash water to the desorption part of the first washing section where the acetonitrile is driven off and burnt with the waste gas. Below the desorption section, part of the liquid freed from acetonitrile is withdrawn in a side current and conducted as extraction water to the second column. It is true that no acetonitrile at all is collected in this case, but the saving of steam is very substantial.

It was surprising and not to be foreseen that the absorption of acrylonitrile and hydrocyanic acid in the first washing column would not be impaired by the presence of the acetonitrile introduced with the wash water; the same amount of wash water suffices for the absorption of acrylonitrile and hydrocyanic acid in the presence of acetonitrile and with the use of pure water.

The process according to the invention is of very great industrial importance, as it can reduce the steam consumption in the processes for the production of acrylonitrile from propylene and ammonia by about 2000–2600 kg. per kg. of acrylonitrile produced.

Figure 2:
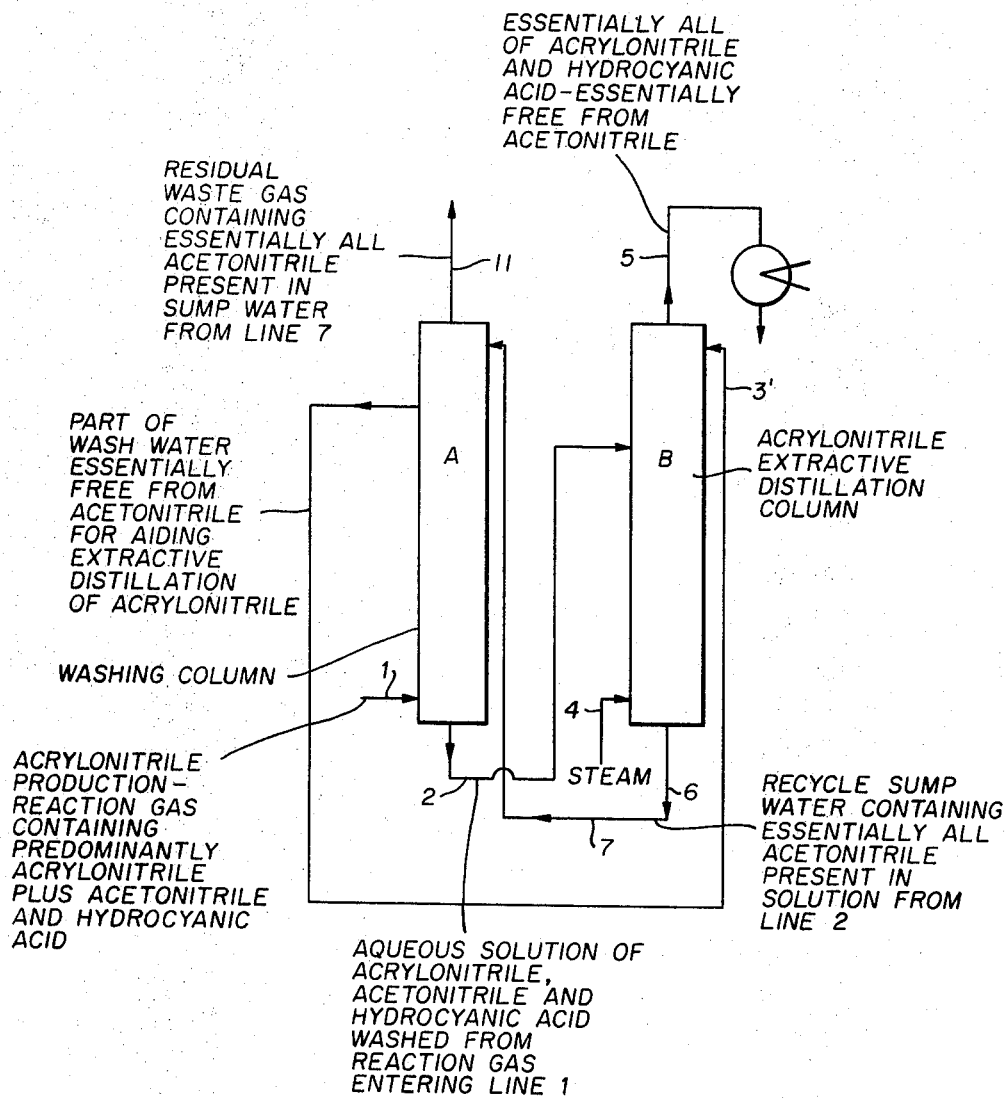

Apparatus for carrying out the process of the invention is shown diagrammatically in FIGS. 1 and 2 of the drawing.

In FIG. 1, A, B and C are the first, second and third columns, respectively, i.e., a first absorption column or zone A, a second extractive distillation column or zone B, and a third distillation column or zone C. The numbered lines are conduits whose function is explained in the example below. At the ends of conduits 5 and 10 are devices for collecting acrylonitrile and acetonitrile, respectively.

In the process described above which does not require the third column, column C, conduits 3, 8, 9 and 10 and the device for collecting acetonitrile are omitted, and instead the simpler construction of FIG. 2 is used, in which like parts to those of FIG. 1 are correspondingly designated, while conduit 3' is provided to conduct part of the liquid freed from acetonitrile as extraction water from the first column A to the second column B.

The process of the invention is illustrated by the following example in connection with the apparatus of FIG. 1.

EXAMPLE 54,800 cubic metres per hour (S.T.P., i.e. at standard temperature and pressure) of a reaction gas from a process for the production of acrylonitrile by oxidation of propylene in the presence of ammonia are introduced via the conduit 1 into the sump of a first washing column A with 55 plates. The gas contains 3125 kg. of acrylonitrile, 320 kg. of acetonitrile and 1415 kg. of hydrocyanic acid; the temperature is 25° C.

92,679 kg. per hour of an aqueous solution containing 3100 kg. of acrylonitrile, 320 kg. of acetonitrile and 1415 kg. of hydrocyanic acid are withdrawn from the sump of the washing column A via the conduit 2 and, after heating to about 80° C., are conducted to the 35th plate of a second stripping column B containing 65 plates in all. 38 cubic metres per hour of water at 70° C. flow on to the uppermost plate of the second column via conduit 3. The sump of the second column is heated by introduction via 4 of 12.7 metric tons per hour of steam. 3100 kg. per hour of acrylonitrile, 1390 kg. per hour of hydrocyanic acid and 0.5 kg. per hour of acetonitrile are withdrawn at the head via conduit 5. 123,344 kg. per hour of water with 319.5 kg. per hour of acetonitrile are withdrawn from the sump via 6. This run-off from the sump is divided into two portions, as described below.

About 70,000 kg. per hour of water with about 180 kg. per hour of acetonitrile are conducted, after cooling to 50–60° C., via conduit 7 to the uppermost plate of the washing column A; 53,538 kg. per hour of water with about 139.5 kg. per hour of acetonitrile are conducted via conduit 8 to the 45th plate of a third stripping column C which contains 55 plates in all, the sump of which is heated via conduit 9 with 6.2 metric tons per hour of steam, and from the head of which 139.5 kg. per hour of acetonitrile and 34.9 kg. per hour of water are distilled off via conduit 10. The run-off from the sump of the third column C is cooled and 38 cubic metres per hour thereof are conducted at 70° C. via conduit 3 to the uppermost plate of the second column B.

The reaction gas leaving the first washing column A via conduit 11 contains about 180 kg. per hour of acetonitrile.

What is claimed is:

1. Process for separating acrylonitrile and acetonitrile from a gaseous mixture containing such nitriles which comprises washing out substantially completely the attendant acrylonitrile and acetonitrile from such gaseous mixture with wash water at a temperautre between about 40–100° C. in an absorption zone, conducting the resulting aqueous phase run-off from said absorption zone to an acrylonitrile extractive distillation zone and driving off and collecting most of the acrylonitrile in gaseous form from such aqueous phase by extractive distillation in said acrylonitrile extractive distillation zone, conducting at most a part of the acrylonitrile-depleted aqueous phase run-off from said acrylonitrile extractive distillation zone to an acetonitrile distillation zone and driving off and collecting the acetonitrile contained therein, conducting at least a part of the acrylonitrile-depleted aqueous phase run-off from said acrylonitrile extractive distillation zone and which contains acetonitrile as wash water at a temperature between about 40–100° C. to said absorption zone, and recovering and burning the resultant water-washed gas from said absorption zone depleted of acrylonitrile desorbed thereby from the acetonitrile-containing wash water conducted to said absorption zone from said acrylonitrile extractive distillation zone.

2. Process according to claim 1 wherein the resulting acetonitrile-depleted aqueous residue from said acetonitrile distillation zone is conducted to said acrylonitrile extractive distillation zone to enhance the extractive distillation of acrylonitrile therein.

3. Process according to claim 2 wherein said absorption zone is in the form of an absorption column in the upper 10–20% of which desorption of the predominant part of the acetonitrile from the wash water from said acrylonitrile extractive distillation zone into the residual water-washed gaseous mixture takes place, and in the remaining lower 90–80% of which correspondingly substantially complete absorption of the acrylonitrile and acetonitrile in the starting gaseous mixture into such wash water takes place.

4. Process according to laim 3 wherein at least about 90% of the acetonitrile is desorbed from the wash water in the upper 10–20% of such absorption column.

5. Process according to claim 3 wherein the starting gaseous mixture contains at least about 320 kg. acetonitrile per 54,800 m.$^3$ at standard temperature and pressure of such starting gaseous mixture.

6. Process for separating acrylonitrile and acetonitrile from a gaseous mixture containing such nitriles which comprises washing out substantially completely the attendant acrylonitrile and acetonitrile from such starting gaseous mixture, which contains less than 320 kg. acetonitrile per 54,800 m.$^3$ at standard temperature and pressure of such starting gaseous mixture, with wash water at a temperature between about 40–100° C. in an absorption zone, conducting the resulting aqueous phase run-off from said absorption zone to an acrylonitrile extractive distillation zone and driving off and collecting most of the acrylonitrile in gaseous form from such aqueous phase by extractive distillation in said extractive distillation zone, conducting all of the acrylonitrile-depleted aqueous phase run-off from said extractive distillation zone and which contains such acetonitrile as wash water at a temperature between about 40–100° C. to said absorption zone, such that already water-washed gas in countercurrent flow in said absorption zone first contacts such incoming acetonitrile-containing aqueous phase run-off from said extractive distillation zone and desorbs acetonitrile therefrom to provide thereby acetonitrile-depleted wash water which contacts thereafter the starting gaseous mixture to wash acrylonitrile and acetonitrile therefrom, recovering and burning the resultant water-washed gas from said absorption zone depleted of acrylonitrile by said washing and containing acetonitrile desorbed thereby from the acetonitrile-containing wash water conducted to said absorption zone from said extractive distillation zone, and conducting a part of the acetonitrile-depleted wash water prior to washing contact with starting gaseous mixture to said extractive distillation zone to enhance the extractive distillation of acrylonitrile therein, whereby all acetonitrile is removed from the system by burning said water-washed gas recovered from said absorption zone.

7. Process according to claim 1 wherein the starting gaseous mixture contains hydrocyanic acid, propane and carbon oxides as well as residual propylene, in addition to said acrylonitrile and acetonitrile.

8. Process for separating acrylonitrile and acetonitrile from a gaseous mixture containing such nitriles which comprises washing out substantially completely the attendant acrylonitrile and acetonitrile from such gaseous mixture with wash water at a temperature between about 40–100° C. in countercurrent flow in an absorption zone, conducting the resulting aqueous phase run-off from said absorption zone to an acrylonitrile extractive distillation zone and driving off and collecting essentially all of the acrylonitrile in gaseous form from such aqueous phase by extractive distillation in said extractive distillation zone, conducting at most a part of the acrylonitrile-depleted aqueous phase run-off from said acrylonitrile extractive distillation zone to an acetonitrile distillation zone and driving off and collecting the acetonitrile contained therein, conducting at least a part of the acrylonitrile-depleted aqueous phase run-off from said acrylonitrile extractive distillation zone and which contains acetonitrile as wash water at a temperature between about 40–100° C. to said absorption zone, such that already water-washed gas in countercurrent flow in said absorption zone first contacts such incoming acetonitrile-containing aqueous phase run-off from said acrylonitrile extractive distillation zone and desorbs acetonitrile therefrom to provide thereby acenitrile-depleted wash water which contacts thereafter the starting gaseous mixture to wash acrylonitrile and acetonitrile therefrom, and recovering and burning the resultant water-washed gas from said absorption zone depleted of acrylonitrile by said washing and containing acetonitrile desorbed thereby from the incoming acetonitrile-containing wash water conducted to said absorption zone from said acrylonitrile extractive distillation zone.

References Cited

UNITED STATES PATENTS

| | | | |
|---|---|---|---|
| 2,526,676 | 10/1950 | Lovett | 260—465.3 |
| 3,201,918 | 8/1965 | Sennewald et al. | 260—465.9 |
| 3,210,399 | 10/1965 | Krzemicki | 203—42 |
| 3,262,963 | 7/1966 | Modiano et al. | 260—465.9 |
| 3,305,308 | 2/1967 | Sennewald et al. | 260—465.9 |
| 3,352,764 | 11/1967 | Tyler | 203—78 |

FOREIGN PATENTS 638,617  3/1962  Canada.

WILBUR L. BASCOMB, JR., Primary Examiner

U.S. Cl. X.R.

55—56; 203—42, 84, 85; 260—465.9